US012659164B1

(12) United States Patent　(10) Patent No.: US 12,659,164 B1

Mangold　(45) Date of Patent:　Jun. 16, 2026

(54) CRYPTOGRAPHIC VERIFICATION SYSTEM

(71) Applicant: Fenris LLC, Twin Lakes, WI (US)

(72) Inventor: David G. Mangold, Twin Lakes, WI (US)

(73) Assignee: Fenris LLC, Twin Lakes, WI (US)

( * ) Notice: Subject to any disclaimer, the term of this patent is extended or adjusted under 35 U.S.C. 154(b) by 0 days.

(21) Appl. No.: 19/320,246

(22) Filed: Sep. 5, 2025

Related U.S. Application Data

(60) Provisional application No. 63/746,364, filed on Jan. 17, 2025.

(51) Int. Cl.
H04L 9/32 (2006.01)
G06F 21/62 (2013.01)

(52) U.S. Cl.
CPC ........ H04L 9/3236 (2013.01); G06F 21/6254 (2013.01); H04L 9/3228 (2013.01); H04L 9/3231 (2013.01); H04L 9/3247 (2013.01)

(58) Field of Classification Search
None
See application file for complete search history.

(56) References Cited

U.S. PATENT DOCUMENTS

| | | |
|---|---|---|
| 8,112,365 B2 | 2/2012 | Foster |
| 8,229,782 B1 | 7/2012 | Adams |
| 8,527,307 B2 | 9/2013 | Hamilton, II |
| 8,650,048 B1 | 2/2014 | Hopkins, III |
| 9,270,711 B1 | 2/2016 | Rowland |
| 9,584,526 B2 | 2/2017 | Williams |
| 10,147,147 B2 | 12/2018 | Himel |
| 10,657,479 B2 | 5/2020 | Griffin |
| 10,740,805 B2 | 8/2020 | Stovall |
| 11,424,908 B2 | 8/2022 | Bartolucci |
| 11,470,051 B1 | 10/2022 | Berkas |
| 11,681,879 B2 | 6/2023 | Ridgill, II |

(Continued)

OTHER PUBLICATIONS

Singireddy, Sneha, "Applying Deep Learning to Mobile Home and Flood Insurance Risk Evaluation", American Advanced Journal for Emerging Disciplinaries (AAJED), vol. 1, Issue 1, ISSN: 3067-4190, Dec. 2024 (Year : 2024), 16 pages.

*Primary Examiner* — Brandon Hoffman

(74) *Attorney, Agent, or Firm* — Sheppard Mullin Richter & Hampton LLP

(57)　ABSTRACT

A computer-implemented method, system, and program product is disclosed for anonymized user authentication that dissociates a user's identify from a report submission after successful authentication. The method authenticates field personnel using organization-specific credentials and one-time passcodes, then establishes mathematically anonymous sessions that permanently dissociate user identity from report submissions. Field compliance data including geolocation, equipment status, environmental conditions, and photographic evidence is captured with complete offline capability. The system generates timestamped cryptographic hashes representing each report and records them immutably on distributed ledger networks, while maintaining full report data in encrypted off-chain storage. The system enables regulatory compliance documentation and litigation defense evidence generation, while maintaining complete reporter anonymity through cryptographic guarantees.

10 Claims, 8 Drawing Sheets

(56)           References Cited

U.S. PATENT DOCUMENTS

| | | |
|---|---|---|
| 11,882,225 B1 | 1/2024 | Griffin |
| 2003/0195857 A1 | 10/2003 | Acquisti |
| 2005/0076089 A1 | 4/2005 | Fonseca |
| 2007/0127693 A1 | 6/2007 | D Ambrosio |
| 2013/0110399 A1 | 5/2013 | Moss |
| 2014/0017646 A1 | 1/2014 | Seitzberg, III |
| 2014/0074976 A1 | 3/2014 | Greenberg |
| 2014/0132409 A1 | 5/2014 | Billman |
| 2014/0244318 A1 | 8/2014 | Drake |
| 2014/0257862 A1 | 9/2014 | Billman |
| 2016/0027129 A1 | 1/2016 | Pallaghy |
| 2016/0055442 A1 | 2/2016 | Chadwick |
| 2016/0292789 A1 | 10/2016 | Rajagopalan |
| 2017/0169390 A1 | 6/2017 | Wesselink |
| 2017/0171297 A1 | 6/2017 | Arzoumanian |
| 2018/0082238 A1 | 3/2018 | Shani |
| 2018/0157995 A1 | 6/2018 | O'Malley |
| 2019/0318265 A1 | 10/2019 | Gould |
| 2020/0145498 A1* | 5/2020 | Grayson ............ H04L 63/0407 |
| 2020/0160248 A1 | 5/2020 | Harmon |
| 2020/0336907 A1 | 10/2020 | Jain |
| 2021/0042854 A1 | 2/2021 | Hazy |
| 2021/0312351 A1 | 10/2021 | Pourmohammad |
| 2021/0390472 A1 | 12/2021 | Amravatkar |
| 2022/0067665 A1 | 3/2022 | Westerheide |
| 2022/0215744 A1 | 7/2022 | Ton-That |
| 2022/0261758 A1 | 8/2022 | Kim |
| 2023/0044173 A1 | 2/2023 | Efrat |
| 2023/0083724 A1 | 3/2023 | Cella |
| 2023/0162156 A1 | 5/2023 | Mitchell |
| 2023/0316185 A1 | 10/2023 | Lee |
| 2024/0144118 A1 | 5/2024 | Gundlapalli |
| 2024/0185360 A1 | 6/2024 | Kodidala |
| 2024/0261692 A1 | 8/2024 | Sliwka |
| 2025/0078499 A1 | 3/2025 | Simonelli |
| 2025/0095074 A1 | 3/2025 | Ketharaju |
| 2025/0233743 A1 | 7/2025 | Aldweesh |

* cited by examiner

500

600

Human In The Loop Online Reporting Process Flow with Blockchain Anchoring

CRYPTOGRAPHIC VERIFICATION SYSTEM

CROSS-REFERENCE TO RELATED APPLICATIONS

This application claims the benefit of U.S. Provisional Patent Application No. 63/746,364 filed on Jan. 17, 2025, the contents of which are hereby incorporated by reference herein in their entirety, for all purposes.

TECHNICAL FIELD

The present disclosure relates generally to cryptographic verification systems for generating legally defensible compliance evidence. In particular, some aspects relate to systems for establishing cryptographically secure and anonymized reporting sessions that permanently dissociate user identity from submitted reports while generating tamper-proof cryptographic hashes and digital signatures at the time and place of data capture, with subsequent synchronization of immutable verification records to distributed ledgers upon network restoration.

BACKGROUND

Reporting and documentation of field conditions are critical functions for utility companies, land management agencies, and environmental organizations seeking to mitigate the threat of wildfire damage and ensure public safety. Traditionally, these entities have relied on a combination of manual field inspections, paper-based forms, and rudimentary digital tools to document site conditions, assess equipment status, and record vegetation or environmental hazards. Given the widespread geographical scope of operations and the need for timely intervention, field data is often collected under challenging conditions, sometimes reported through mobile devices but frequently lacking standardized formats and verification mechanisms.

Current digital systems generally employ standardized forms or mobile applications to facilitate the collection of field report data, such as photographs, location tags, and descriptive notes. These solutions may provide basic authentication such as login credentials tied to an organizational directory but are often limited in their ability to ensure the data originates exclusively from authorized personnel. Moreover, identity and report data are commonly linked in ways that can compromise privacy or result in traceability concerns, particularly where regulatory investigations or legal proceedings demand evidence of procedural integrity. Efforts to anonymize field submissions are typically ad hoc, lacking consistent protocols for removing or masking metadata that may inadvertently reveal the identity of individuals or devices involved in reporting.

A fundamental limitation of existing systems is the persistent linkage between reporter identity and submitted data, creating substantial barriers to honest field reporting. Field personnel frequently avoid documenting safety violations, equipment deficiencies, or procedural non-compliance due to fear of professional retaliation, career consequences, or supervisor identification through timing correlations, voice patterns, or other identifying characteristics. This systematic under-reporting creates dangerous blind spots in organizational safety management, particularly in critical infrastructure sectors where undocumented patterns can lead to catastrophic failures.

Existing solutions fundamentally lack the ability to generate legally defensible evidence of field compliance activities. Current systems cannot provide cryptographic proof of data authenticity, temporal integrity, or chain of custody requirements necessary for regulatory proceedings or litigation defense. When organizational compliance is challenged in legal contexts, traditional documentation systems fail to provide the mathematical verification required to demonstrate systematic adherence to safety protocols or regulatory requirements.

Existing solutions lack the ability to confirm the integrity and authenticity of reported data across multiple users, time periods, and field locations. For example, existing systems tend to lack comprehensive audit trails. Verification of content such as photographic evidence or environmental measurements is generally manual and time-consuming, especially where multiple parties or organizations are involved.

Furthermore, existing systems operate in organizational silos, preventing the identification of systematic safety patterns that span multiple organizations, geographic regions, or operational contexts. Critical safety trends that might be apparent when viewed across multiple entities remain invisible when data is confined to individual organizational boundaries, limiting the ability to predict and prevent systematic failures before they result in catastrophic incidents.

BRIEF SUMMARY OF THE DISCLOSURE

Aspects of the disclosed systems and methods provide a computer-implemented method and system for enabling anonymous, authenticated mobile reporting and documentation of infrastructure conditions through a session-based protocol that dissociates user identity from submitted reports. Certain aspects of the present disclosure may support both online and offline operation by generating cryptographic hashes and digital signatures at the time and place of data capture, later synchronizing immutable records to a distributed ledger upon network restoration.

For example, the system may provide a mobile application for report collection and evidence upload. The mobile application may include a user interface module to guide users through each step of the anonymous authentication and reporting process by displaying prompts and collecting input. The system may further include a secure authentication module for organization-specific access control and session anonymization, and a cryptographic module for generating and verifying report hashes and signatures. The system may further include a privacy module that remove personal or device metadata from submissions, manage secure offline storage and automated synchronization, and generate and record immutable audit trails on a blockchain or distributed ledger.

The anonymous authentication process may be orchestrated by several system modules working in concert. For example, users may scan a QR code using the user interface module to initiate a new authenticated session. In response to receiving a scanned QR code, the mobile application may extract user and company information. The authentication module may then validate the user and company information. In response to a successful validation, the user interface module may display a welcome screen and prompt the user for additional information (e.g., an employee ID). The secure authentication module may then verify the additional information against the company roster and employee email database. In response to a successful verification, the secure authentication module may then generate a one-time passcode to send to the employee's registered email.

In response to a successful authentication, the privacy module may generate a unique session identifier and dissociate and permanently destroy any mapping between real user credentials and the unique session identifier by setting the employee ID value to "null." In certain embodiments, the privacy module may then initiate biometric authentication enrollment and/or verification. In response to a successful registration or verification, the privacy module may locally generate a distributed ledger network public/private key pair and ensure that the private key is securely stored only on the user's device, such that the private key never leaves the device or is transmitted to the backend or any external server. Only the public key and anonymous ID are securely stored or transmitted as needed.

Certain embodiments may provide custom user interfaces that allow personnel to interact with the mobile application that employs predefined, hierarchical dropdown menus for classifying infrastructure condition data. In some aspects, the user interface may be configured to allow automatic uploads of photographic evidence and may additionally anonymize associated metadata by removing, masking, or altering information capable of identifying a submitting user or originating device. In certain embodiments, cryptographic verification program 110 can be configured to function for offline operation by encrypting and temporarily storing all user input data and captured evidence directly on the device for extended periods until network connectivity becomes available.

Aspects of the disclosed systems and methods establish cryptographic audit trails for evidentiary reliability by digitally timestamping each report submission and generate a unique cryptographic hash of the entire report, including any attached evidence. The systems and methods store the timestamp and hash as immutable records on a blockchain or similar tamper-resistant ledger while keeping the complete, unaltered report data encrypted in secure storage. When a regulatory or legal request arises, aspects of the disclosed systems and methods enforce access controls to decrypt and provide only the relevant portions of the encrypted data. In this manner aspects of the disclosed systems and method can preserve confidentiality and ensure integrity of the audit trail, while enabling independent verification that the report content remains unaltered from its original submission.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto and their equivalents thereof.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

Existing compliance and field reporting systems face significant technical challenges that limit their effectiveness, reliability, and scalability. Conventional solutions often rely on basic authentication methods and manual verification processes, which can be vulnerable to unauthorized access and data manipulation. These platforms typically maintain persistent associations between field personnel and submitted data, leading to privacy concerns and restricting support for anonymous data contributions. Additionally, many current systems store field reports in mutable databases without cryptographically secure audit trails, making it difficult to verify the integrity or provenance of evidence during regulatory reviews or legal proceedings.

Aspects of the present disclosure address these technical limitations through a cryptographic credential verification, anonymized field data capture, and tamper-evident, blockchain-backed audit trails. The disclosed systems utilize dynamic authentication protocols to ensure that only authorized personnel contribute to field reports, while also dissociating user identities from data submissions to enhance privacy protections. Each field report, together with supporting evidence, is cryptographically hashed and timestamped, with immutable records stored on a blockchain or similar ledger ensuring that the integrity and authenticity of documentation can be independently verified at any stage.

By implementing concrete technological improvements such as automated cryptographic credentialing, data anonymization protocols, and tamper-evident storage, aspects of the systems and methods disclosed herein provide specific solutions to technical challenges in field data security, integrity, and privacy, as well as legal evidentiary challenges including chain of custody requirements, data authenticity verification, and admissibility standards for regulatory and judicial proceedings.

Figure 1:
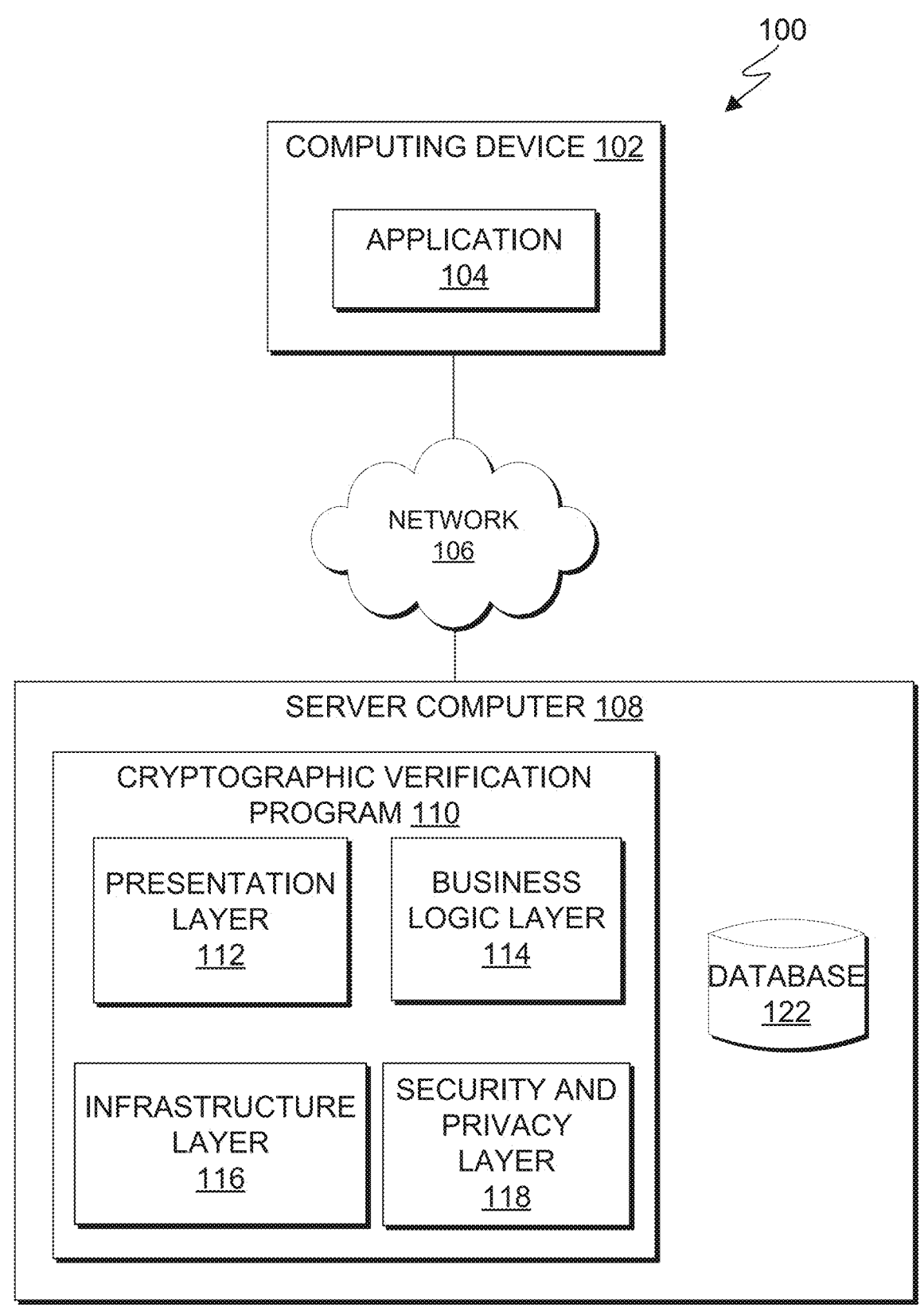
FIG. 1 functional block diagram illustrating a computing environment, in accordance with various embodiments of the systems and methods disclosed herein.

FIG. 1 is a functional block diagram illustrating an example computing environment, generally designated computing environment 100, in accordance with various embodiments of the systems and methods disclosed herein. FIG. 1 provides only an illustration of one implementation and does not imply any limitations with regard to the environments in which different embodiments may be implemented. Many modifications to the depicted environment may be made by those skilled in the art without departing from the scope of the various aspects of systems and methods disclosed herein, as recited by the claims.

Computing environment 100 includes computing device 102 and server computer 108, all interconnected over network 106. Computing device 102 and server computer 108 can be a standalone computer device, a management server, a webserver, a mobile computing device, or any other electronic device or computing system capable of receiving, sending, and processing data. In other embodiments, computing device 102 and server computer 108 can represent a server computing system utilizing multiple computers as a server system, such as in a cloud computing environment, as depicted and described in further detail with respect to FIG. 9. In another embodiment, computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, computing device 102 and server computer 108 each represent a computing system utilizing clustered computers and components (e.g., database server computers, application server computers, etc.) that act as a single pool of seamless resources when accessed within computing environment 100. In some embodiments, computing device 102 and server computer 108 are a single device. Computing device 102 and server computer 108 may include internal and external hardware components capable of executing machine-readable program instructions, as depicted and described in further detail with respect to FIG. 4.

Computing device 102 is a digital device associated on or more entities utilizing an asset management system and users thereof. Computing device 102 includes application 104. Application 104 communicates with server computer 108 to access cryptographic verification program 110 (e.g., using TCP/IP) and database 112. Application 104 can further communicate with cryptographic verification program 110 to enable anonymous, authenticated mobile reporting and documentation of infrastructure conditions through a session-based protocol that dissociates user identity from submitted reports, as discussed in greater detail below. In general, application 104 can be implemented using a browser and web portal or any program that can interface with or otherwise access cryptographic verification program 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among computing device 102 and server computer 108, and other computing devices (not shown) within computing environment 100.

Server computer 108 is a digital device that hosts cryptographic verification program 110 and database 112. In this embodiment, cryptographic verification program 110 and database 112 reside on server computer 108. In other embodiments, cryptographic verification program 110 and/or database 112 can be stored locally on computing device 102. Other embodiments include cryptographic verification program 110 and/or database 112 being local to or virtually part of computing device 108. In yet other embodiments, an instance of cryptographic verification program 110 and/or database 112 can be stored on computing device 102 and can communicate with another instance of cryptographic verification program 110 residing on server computer 108. In some embodiments, cryptographic verification program 110 can be a stand-alone program on a computing device. In certain aspects of the systems and methods disclosed herein, cryptographic verification program 110 and database 112 can be cloud based, utilizing multiple computing devices, made available as a software as a service (SaaS), as part of an infrastructure as a service (IaaS) system, as part of a platform as a service (PaaS), etc.

Cryptographic verification program 110 enables anonymous, authenticated mobile reporting and documentation of infrastructure conditions through a session-based protocol that dissociates user identity from submitted reports. Certain aspects of the present disclosure may support both online and offline operation, ensuring the integrity of field evidence by generating cryptographic hashes and digital signatures at the time and place of data capture, later synchronizing immutable records to a distributed ledger upon network restoration to provide legally defensible audit trails.

Cryptographic verification program 110 includes presentation layer 112, business logic layer 114, infrastructure layer 116, security and privacy layer 118, and user interface 120 each executing discrete roles within the overall process. As reflected below, cryptographic verification program 110 utilizes presentation layer 112 to authenticate field personnel and capture field report data, then processes and analyzes the report via business logic layer 114, securely stores and distributes the proof of submission through infrastructure layer 116, and enforces data protection, anonymity, and auditability via security and privacy layer 118, and provides intuitive interaction workflows through user interface 120.

Presentation layer 112 facilitates user access/authentication and data submission. In this embodiment, presentation layer may include a secure authentication module that can authenticate users of the organization. For example, when a user opens the mobile application, an interface of presentation layer 112 guides them through an authentication protocol. In this embodiment, the authentication protocol may include scanning the company-issued QR code or entering an organization-specific access code. In response to receiving the QR code, cryptographic verification program 110 prompts the user for additional credentials and sends a one-time passcode (OTP), which is sent to a company-verified communication channel ensuring only authorized individuals can proceed, as discussed in greater detail with regard to FIGS. 2A and 2B.

Upon successful authentication, a session manager module in security and privacy layer 118 generates a unique, anonymous session identifier, and permanently destroys any mapping between the user's real-world credentials and the generated session identifier. This programmatic destruction ensures that subsequent field reports and compliance actions are permanently disassociated from the user's identity, providing a technical guarantee of anonymity. As each field report is submitted, only the session identifier, never the user's personal identity, can be retrieved.

In certain embodiments, cryptographic verification program 110 can be configured to function for offline operation for extended periods by encrypting and temporarily storing all user input data and captured evidence directly on the device until network connectivity becomes available. For example, cryptographic verification program 110 may assemble a report data structure comprising a locally generated UUID, timestamp, GPS coordinates, infrastructure condition data, a list of photo file. An example report data structure is shown below:

```
{
"report_id": "uuid-generated-locally",
"timestamp": "2025-01-15T14:30:00Z",
"gps_coordinates": "39.7392,–104.9903",
"classification": "immediate-action",
"sub_classification": "vegetation-in-contact",
"photo_hashes": ["photo-hash1", "photo-hash2" ],
"anonymous_user_id": "anon_7f8e9d2a1b"
}
```

Example report data structure.

Cryptographic verification program 110 may then generate hashes by applying the cryptographic hashing algorithm to the entire report object, individual hashes for photographic evidence collected, and also creating a combined hash of all components, including individual media file hashes. For example, cryptographic verification program 110, upon receiving and processing a completed field report, encrypts the entire report data structure using AES-256 and securely stores this content in a dedicated local directory on the device. Associated photographic evidence is likewise encrypted and maintained within the application's internal photo storage. Each cryptographically signed transaction, which may include the cryptographic hash of the report and a Schnorr digital signature, is prepared and stored locally in a pending transaction queue. Storage is structured into organized folders, such as encrypted_reports/for complete report data, encrypted_photos/for securely stored photo files, and pending_transactions/which maintains signed blockchain transactions that are queued until upload. For example, locally stored files may be organized as follows:

encrypted_reports/report_uuid_1.enc (full report data)

encrypted_photos/photo_photo_hash_1.enc (photo evidence)

pending_transactions/rverification_tx_1.json (signed for later blockchain submission)

This approach ensures that all elements of the field report and supporting evidence remain secure and tamper-resistant until such time as network connectivity is restored.

Additionally, cryptographic verification program 110 appends a digital signature to each report hash using user device-stored cryptographic keys (such as Schnorr signatures in blockchain-integrated embodiments). This signature binds the reported event immutably to the reporting session and device, producing a tamper-evident, time-stamped event record.

Continuing to function in offline mode, cryptographic verification program 110 may encrypt the report submission and associated field condition data using the AES-256 algorithm and stored locally on the device to ensure confidentiality and security. Cryptographic verification program 110 includes any photographic evidence included with the report submission and is kept in a dedicated local application directory. Cryptographic verification program 110 may then digitally sign a blockchain transaction for future submission to the distributed ledger network, but remains stored locally until network connectivity is available. The entire report, along with its associated encrypted files, is organized in structured local directories: one for encrypted report data, another for encrypted photos (identified by their cryptographic hashing algorithm hashes), and a third for pending blockchain transactions. An example of the local storage structure is shown below:

```
├─encrypted_reports/
│├─report_uuid_1.enc (full report data)
│├─report_uuid_2.enc
├─encrypted_photos/
│├─photo_hash_1.enc
│├─photo_hash_2.enc
└─ -pending_transactions/
├─verification_tx_1.json (signed, ready to submit)
└─ -verification_tx_2.json
```

In various embodiments, the distributed ledger may comprise blockchain networks such as Alephium, Ethereum, Solana, SUI, or other distributed ledger technologies. The cryptographic hashing may utilize Blake3, SHA-256, SHA-3, or other cryptographically secure hash functions. The transaction format may be adapted to the specific requirements of the chosen distributed ledger protocol.

Example Local Storage Structure

Cryptographic verification program 110 may then add these files to a synchronization queue, enabling the system to manage and track which reports are pending upload when the device is able to connect to the network. This architecture ensures that sensitive data remains protected and tamper-resistant throughout offline operation and until secure upload is possible.

Cryptographic verification program 110 continuously monitors device network connectivity status. In response to detecting online connection, cryptographic verification program 110 initiates a synchronization process, transmitting only minimal, non-sensitive metadata to the distributed ledger network. For example, cryptographic verification program 110 may transmit the following on-chain payload: the completed report's hash, a timestamp, the report type (e.g., safety-risk), the anonymous user/session ID, a digital signature, and a generalized GPS region identifier. An example of the distributed ledger networkTransaction submission is shown below.

```
{
"report_hash": "verification-hash-of-complete-report",
"timestamp": "2025-01-15T14:30:00Z",
"report_type": "safety-risk",
"anonymous_user_id": "anon_7f8e9d2a1b",
"signature": "schnorr-signature",
"gps_region": "region-identifier-not-exact-coords"
}
```

Example blockchain transaction submission.

Cryptographic verification program 110 may then upload the encrypted detailed report files, including the report data, exact GPS coordinates, and photo files, to a secure, off-chain storage. Put another way, cryptographic verification 110 keeps the full data, that is, encrypted detailed report files, including the report data, exact GPS coordinates, and photo files, in an off-chain storage. All database entries are linked to their corresponding distributed ledger network transaction hashes, thereby creating a permanent, blockchain-anchored audit trail that is easily verifiable for regulatory and legal purposes while fully protecting sensitive field data and personal privacy.

Business logic layer 114 orchestrates critical data processing and compliance verification functions for secure data analysis and verification. For example, a smart contract manager component of cryptographic verification program 110 initiates blockchain transactions to immutably record cryptographic proofs of submission and, where predetermined verification criteria are met such as multiple independent confirmations of the same issue. In some embodiments, cryptographic verification program 110 can then distribute tokenized incentives to authorized field personnel.

Anti-collusion and privacy modules rigorously validate the authenticity of each report, checking for duplicate or coordinated submissions while preserving each user's anonymity.

Infrastructure layer 116 manages application hosting, data processing, and decentralized storage. In this embodiment, cryptographic verification program 110 leverages distributed ledger platforms (e.g., such as Alephium) to record cryptographic proofs posting only a subset of report hashes and metadata to the blockchain for tamper-evident recordkeeping while retaining detailed report content off-chain in encrypted form. A distributed ledger may refer to a type of database that is consensually shared, synchronized, and replicated across multiple participants (nodes), typically in different locations. Distributed ledgers may enable secure, transparent, and tamper-resistant recording of transactions or data. In another embodiment, the system may alternatively employ other distributed ledger network technologies including but not limited to Ethereum, Solana, Sui, Polygon, Avalanche, or future blockchain protocols In some embodiments, cryptographic verification program 110 may be integrated at the infrastructure layer with external systems (e.g., email servers for authentication OTPs, geofencing APIs for GPS validation, weather and satellite data feeds for risk correlation, etc.) enrich the raw data and support automated compliance workflows.

Security and privacy layer 118 maintains strict privacy, access control, and compliance oversight throughout every phase of the data lifecycle. In this embodiment security and privacy layer 118 may include a cryptographic module that generates and verifies report hashes and signatures. Cryptographic verification program 110 may further include a privacy module that anonymizes data by destroying links to original IDs through the session manager as soon as anonymous identities are created and strips all residual metadata from field submissions, applies algorithmic fuzzing to GPS/timestamps for non-critical reports, and enforces access controls that maintain role-based visibility and audit history for legal or regulatory review. Cryptographic verification program 110 can, track adherence to both internal privacy mandates and external regulatory requirements, assesses system activities for policy alignment, and generates auditable compliance reports at both event and periodic levels. Through this coordinated and technically rigorous approach, the system achieves defensible, privacy-preserving, and immutable wildfire compliance verification.

In certain embodiments, cryptographic verification program 110 may be configured to enable subsequent authentication and verification of stored report submissions by leveraging a combination of digital signatures, cryptographic hashes, and encrypted report condition data. When a request is made to authenticate a specific report submission, cryptographic verification program 110 retrieves the immutable cryptographic hash and associated digital signature from the distributed ledger. Next, cryptographic verification program 110 accesses the encrypted field condition data for the relevant report and decrypts from secure off-chain storage, subject to appropriate access controls. Cryptographic verification program 110 then recomputes a cryptographic hash from the decrypted report condition data and compares this value to the hash retrieved from the ledger. In parallel, cryptographic verification program 110 may then verify the validity of the digital signature using the public key corresponding to the anonymized session under which the report was originally submitted. Only if both the hash comparison and the signature validation are successful does the system confirm that the report submission is authentic, remains unaltered since its creation, and originates from an authorized session. This process provides an auditable, tamper-evident mechanism for independently confirming the integrity and provenance of field report submissions in compliance, regulatory, or legal contexts.

In general, database 122 can be implemented using any non-volatile storage media known in the art. For example, database 122 can be implemented with a tape library, optical library, one or more independent hard disk drives, or multiple hard disk drives in a redundant array of independent disk (RAID). In this embodiment database 122 is stored on server computer 108. In other embodiments, database 122 can be stored on other computing devices (not shown) or can be a combination of one or more other databases that has given permission access to cryptographic verification program 110.

The following example illustrates how cryptographic verification program 110 documents, store, and synchronizes report submissions across different scenarios and timeframes. In this example, on Day 1, a field worker operating in a region without cellular connectivity encounters a potential hazard. Using cryptographic verification program 110, the field worker documents the compliance issue and captures one or more photographs to serve as supporting evidence. Upon completion, cryptographic verification program 110 signs the report locally using a device-held private key (such as implementing the Schnorr signature algorithm) and generates corresponding proof of report cryptographic hashes for both the report data and each image file. All structured data, including incident details, hashes, and the digital signature, are encrypted using strong symmetric encryption (e.g., AES-256) and securely stored within local directories on the device. Cryptographic verification program 110 allows the field worker to continue operating and submitting additional reports in the field, with all information queued and locally retained until connectivity is re-established.

On Day 2, when the field worker returns to a location with available WiFi or cellular data service, cryptographic verification program 110 automatically detects the restored connection and may initiate a secure synchronization process, uploading the previously encrypted report data and associated media to the central encrypted database. Cryptographic verification program 110 submits a signed report (i.e., entry) containing only the cryptographic hash of the complete report, an anonymized user identifier, timestamp, and other minimal metadata to a distributed ledger network.

Figure 2A:
FIG. 2A is an example flow diagram illustrating operational steps for establishing an anonymous authenticated session, in accordance with various embodiments of the systems and methods disclosed herein.

FIG. 2A is an example flow diagram 200 illustrating operational steps for establishing an anonymous authenticated session, in accordance with various embodiments of the systems and methods disclosed herein.

When a user launches the mobile application, cryptographic verification program 110 initiates the access and authentication workflow by prompting the user to scan a company-issued QR code, which redirects the user to a dedicated company application instance. Next, cryptographic verification program 110 instructs the authentication service to prompt the user to enter their Employee ID. In response to receiving the employee's ID, cryptographic verification program 110 may determine whether the employee ID is valid by comparing the received employee ID against the company's roster and/or employee email address table. In response to determining that the employe ID is not valid, cryptographic verification program 110 may initiate a failed attempt protocol that specifies a series of actions taken by cryptographic verification program 110. For example, the failed attempt protocol may specify an acceptable login failure of three attempts. For the first failed attempt, cryptographic verification program 110 may display the following message: Employee ID not found, please try again. For the second failed attempt, cryptographic verification program 110 may display the following message: Employee ID not found. Contact your supervisor or IT support. For the third failed attempt, cryptographic verification program 110 may end the process and temporarily lock out the user for a configurable time period (e.g., 15-30 minutes).

In response to determining that the employee ID is valid, cryptographic verification program 110 may generate and dispatch a one-time passcode (OTP) to the employee's registered company email address using the integrated email service provider. In response to a successful OTP validation, cryptographic verification program 110 may store the interaction in a verification table. For example, cryptographic verification program 110 may update the verification table to dissociate the employee ID from the unique session identifier by setting the employee ID value to "Null." If the received OTP password is incorrect, cryptographic verification program 110 may generate an alert that the OTP authentication has failed and may issue another OTP to the user. In certain embodiments, cryptographic verification program 110 may then prompt a user to re-enter their employee ID.

Cryptographic verification program 110 may then set up or proceed with biometric authentication. In instances where a user has not set up biometric authentication, cryptographic verification program 110 transmits instructions to a biometric submodule to prompt the user to enroll or authenticate using fingerprint or facial recognition, with the biometric data being linked to the cryptographic wallet access for the session. In instances where biometric authentication is already set up and active on a user's mobile device, cryptographic verification program 110 prompts the user to authenticate using their enrolled fingerprint or facial recognition, leveraging the existing biometric data linked to the cryptographic wallet access for the session. Cryptographic verification program 110 ensures that all biometric templates are securely stored exclusively within the device's hardware security module and are never transmitted or accessible beyond the device itself. In certain embodiments, cryptographic verification program 110 may alternate paths for authentication. For example, in some embodiments, cryptographic verification program 110 may support web-based authentication pathways to enhance accessibility and user convenience. For example, cryptographic verification program 110 can allow users to initiate authentication through third-party identity providers such as Google or Facebook, leveraging federated login protocols to validate user credentials. In other embodiments, cryptographic verification program 110 may present alternate options for secure session setup, such as manual wallet creation using a seed phrase or privacy-preserving authentication methods including ZKLogin.

Upon successful biometric authentication, cryptographic verification program 110 manages the transition to the field reporting interface, displaying structured forms to collect photographs, GPS coordinates, environmental measurements, and equipment status, while fully supporting offline operation. Cryptographic verification program 110 may queue any collected data during the offline mode for secure synchronization by directing relevant subcomponents to encrypt and store the data locally until the infrastructure layer detects restored network connectivity, at which point secure upload and processing are initiated.

Figure 2B:
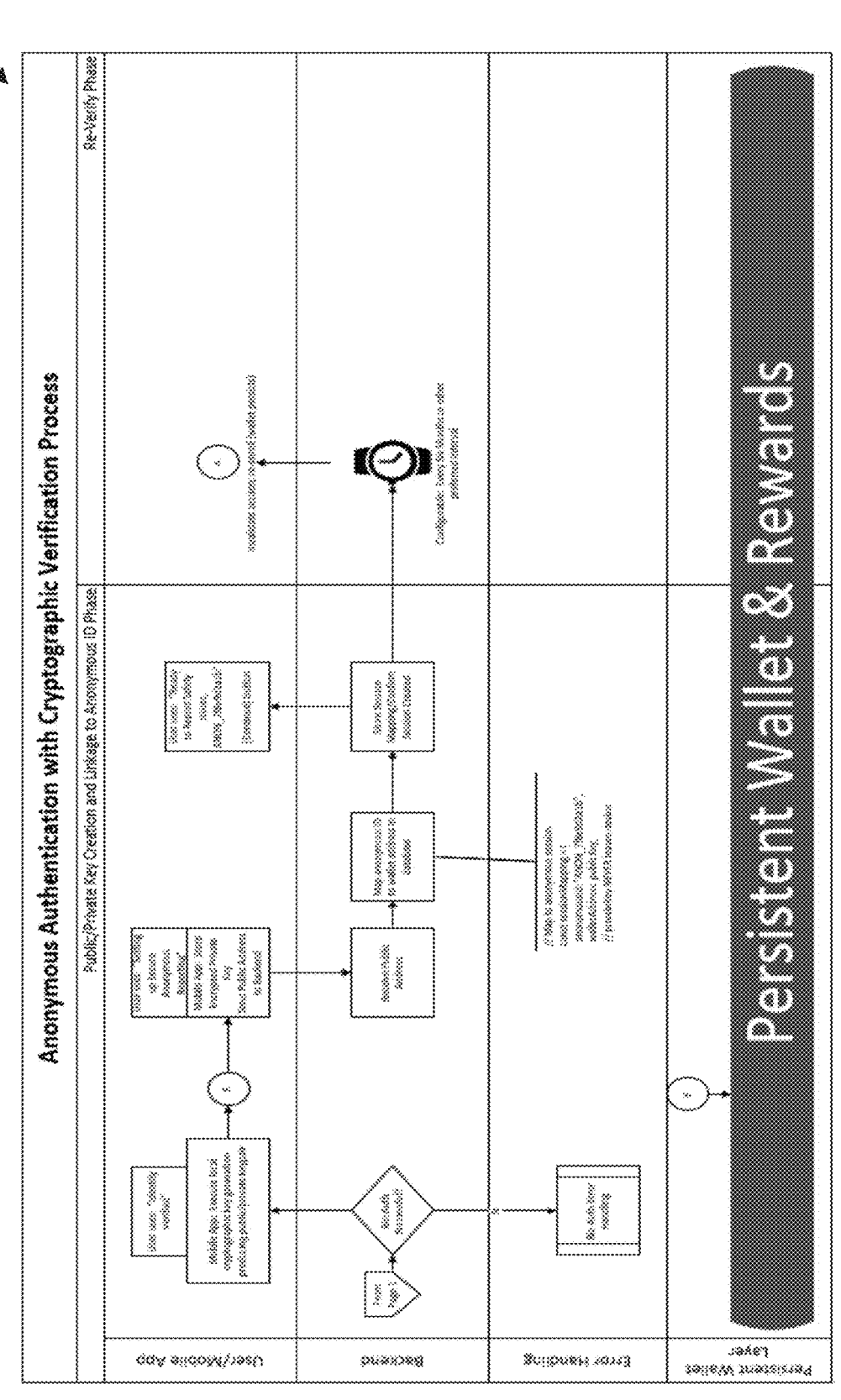
FIG. 2B is an example flow diagram illustrating operational steps for wallet creation, in accordance with various embodiments of the systems and methods disclosed herein.

FIG. 2B is an example flow diagram 202 illustrating operational steps for wallet creation, in accordance with various embodiments of the systems and methods disclosed herein.

Upon successful first OTP validation, cryptographic verification program 110 further instructs the authentication service to automatically generate a new distributed ledger network wallet that persists beyond sessions (i.e., stays with the authenticated user so as to not be issued a new wallet or private/public key). The wallet may stay with the user even if timeout occurs, subject to reverification of credentials (e.g., timed out intervals of a month, three months, or six months), that is, wallet may persist but the user would need to reverify employment. For example, cryptographic verification program 110 can create a unique public/private key pair, where the private key is securely stored within the device's secure storage and the public address is linked to a newly generated anonymous session token. To ensure privacy, cryptographic verification program 110 initiates a secure anonymous reporting protocol, and in some instances, may display a notification to the user indicating the initiation of a secure and anonymized reporting session.

Cryptographic verification program 110 then generates a new encrypted private key for the authenticated session, ensuring the private key never leaves the secure enclave of the device. The program transmits only the public wallet address to the backend infrastructure. Upon receipt, cryptographic verification program 110 maps the anonymous session ID to the wallet address in a secure database, maintaining a structure such as:

```
//Map to anonymous session
const sessionMapping={
    anonymousId: "ANON_7f8e9d2a1b",
    walletAddress: publicKey,
//privateKey NEVER leaves device
Example Anonymous Session ID Mapping
```

The session mapping data is securely stored, providing a cryptographic association between the user's anonymous ID and the session wallet address, without any possibility of reconstructing the user's original identity. Cryptographic verification program 110 then confirms and establishes the authenticated anonymous session, updating the session manager and privacy module to recognize that anonymous reporting is now enabled. Following this, cryptographic verification program 110 may display a ready-to-report interface to the user, which includes confirmation of secure authentication and displays the assigned anonymous ID (e.g., "ANON_7f8e9d2a1b") to further reassure the user of privacy and anonymity before the reporting interface becomes active. Device reconfiguration is provided at six-month or other user-defined intervals, ensuring ongoing security and operational flexibility.

Figure 3:
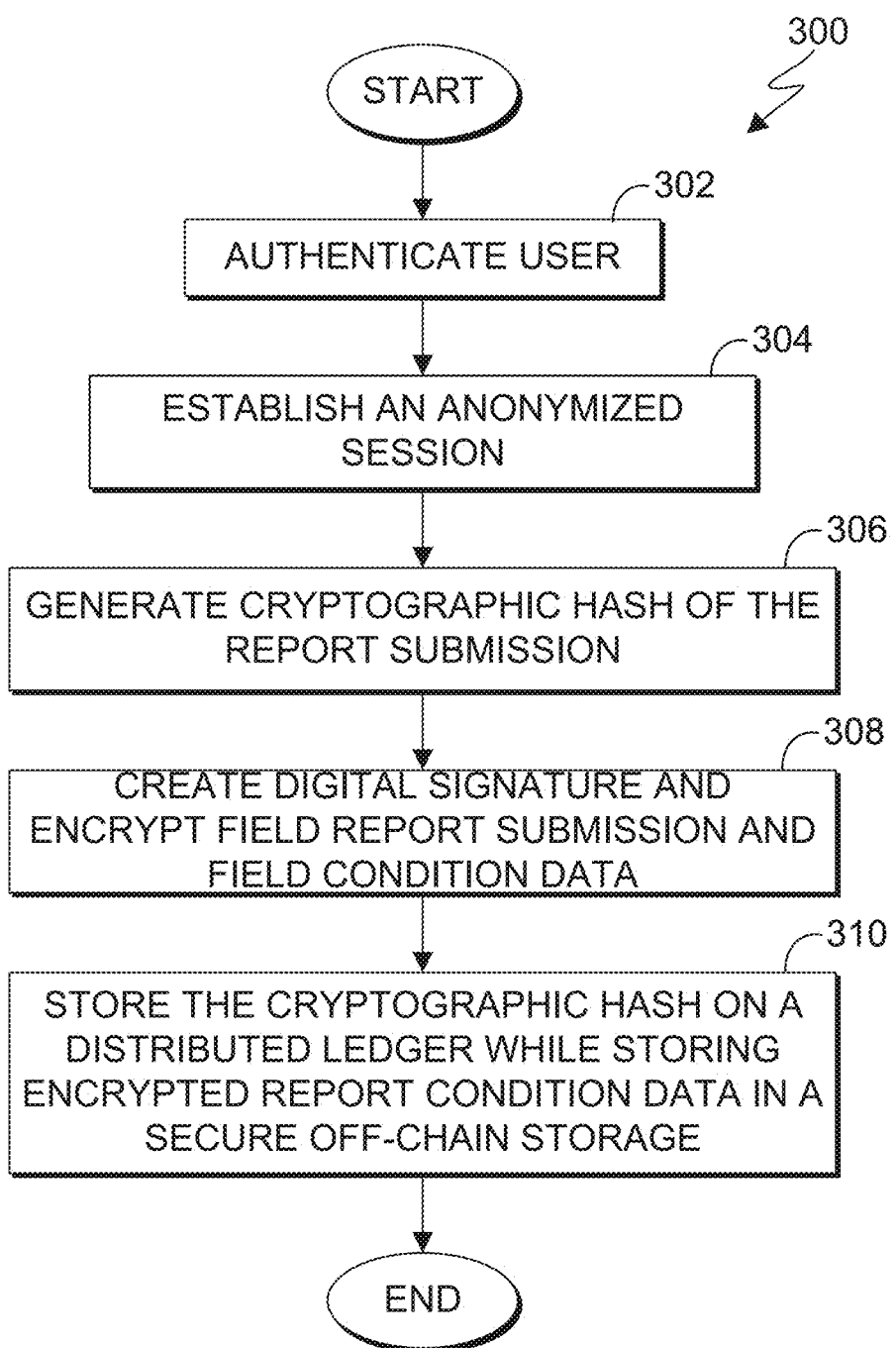
FIG. 3 is a flowchart depicting an example of operational steps for enabling anonymous, authenticated mobile reporting and documentation of infrastructure conditions through a session-based protocol that dissociates user identity from submitted reports, in accordance with various embodiments of the systems and methods disclosed herein.

FIG. 3 is a flowchart 300 depicting an example of operational steps for enabling anonymous, authenticated mobile reporting and documentation of infrastructure conditions through a session-based protocol that dissociates user identity from submitted reports, in accordance with various embodiments of the systems and methods disclosed herein.

In step 302, cryptographic verification program 110 authenticates a user. In this embodiment, cryptographic verification program 110 authenticates a user in response to receiving log in credentials. For example, when a user accesses cryptographic verification program 110 through a mobile application, cryptographic verification program 110 prompts the user to scan a company-issued QR code or enter a designated organization-specific access code. Upon receiving this input, cryptographic verification program 110 verifies the authenticity of the access request by cross-referencing the provided data with the organization's employee directory. Cryptographic verification program 110 may then instruct its authentication service to generate and dispatch a one-time passcode (OTP) to the user's registered company email address. In response to receiving this OTP, verification program 110 validates to complete the two-factor authentication protocol.

In step 304, cryptographic verification program 110 establishes an anonymized session. In response to a successful verification, cryptographic verification program 110 activates its session manager component to generate a random unique session identifier for the field reporting session. Cryptographic verification program 110 may then dissociates and purges any direct mapping between the user's real-world credentials and the anonymous session ID from system memory. For example, cryptographic verification program 110 may destroy any mapping from the user's employee ID to the anonymous session ID by setting the value for the user's employee ID to "Null." In this manner, cryptographic verification program 110 can ensure that all subsequent actions and field report submissions for the session are cryptographically linked only to the anonymous session. In certain embodiments, as mentioned above, for additional security, cryptographic verification program 110 may also require the user to complete biometric verification, where device-stored fingerprint or facial data is checked without transferring any templates off-device.

Cryptographic verification program 110 may then receive field data submission associated with a report submission from one or more components of computing environment 100. As used herein field condition data, also referred to as infrastructure condition data, may refer to any information collected or observed in the field that describes the status, environment, operational characteristics, risks, or activities associated with a particular location or asset. Examples of field condition data include geolocation information (e.g., as GPS coordinates or site identifiers), environmental observations (e.g., weather conditions, temperature, and air quality), asset or equipment status (e.g., maintenance logs, inspection outcomes, or failure reports), structural integrity indicators (e.g., corrosion, physical damage, or compromised supports), safety compliance records (e.g., protocol adherence), access conditions (e.g., legal restrictions or route blockages), media evidence (e.g., photos, video, or sensor readings), incident and observation logs, measurement data (e.g., distance, pressure, electrical readings), and activity records of maintenance or repairs. In addition, field condition data may incorporate external sources, such as regulatory maps, weather feeds, and satellite imagery, to provide a comprehensive and accurate view of conditions affecting infrastructure or assets in real-world settings. In certain embodiments, cryptographic verification program 110 may then apply metadata anonymization protocols to all received data. In this embodiment, cryptographic verification program 110 may strip any device-specific metadata embedded in files (e.g., Exchangeable Image File Format (EXIF) data in images, Media Access Control (MAC) address, other network identifiers, etc.).

In step 306, cryptographic verification program 110 generates a cryptographic hash of the report submission and encrypts any associated field condition data. In this embodiment, cryptographic verification program 110 creates a hash of each report including attached evidence and incident classifications and embeds a timestamp using a cryptographic hashing algorithm. Rather than exposing sensitive operational or personal content, cryptographic verification program 110 commits only the report hash, timestamp, selected geospatial categorization (e.g., a region identifier rather than precise GPS), signature, and an anonymous session ID to the blockchain or distributed ledger. This ensures that the publicly available record is both immutable and privacy-preserving, preventing reconstruction of any underlying confidential details.

In step 308, cryptographic verification program 110 creates a digital signature and encrypts the report submission and supporting evidence at the point of capture, even when operating in offline mode, using advanced encryption protocols (e.g., AES-256). Once the data is secured and anonymized, cryptographic verification program 110 generates a digital signature using a private key associated with the anonymous session ID or unique anonymous web3 identity) for the generated hash of the report and any attachments. In this embodiment, anonymous web3 identity may include a cryptographic wallet, a cryptographic wallet address, and a session management system. Cryptographic verification program 110 may then encrypt the report submission and field condition data (e.g., support evidence) with a cryptographic algorithm (e.g., AES-256). Cryptographic verification program 110 may index and link to their corresponding blockchain hash, providing a verifiable, permanent association between the publicly auditable transaction and the confidential report archive.

In step 310, cryptographic verification program 110 securely stores the prepared data locally until network connectivity is available, at which point it queues the submission for synchronization with the backend infrastructure. In response to determining network connectivity is available, cryptographic verification program 110 may then record the digital signature, hash, timestamp, and minimal metadata as an immutable entry on a blockchain or distributed ledger. In this embodiment, cryptographic verification program 110 may separately store the encrypted report submission and associated evidence in a secure, off-chain storage for future retrieval, compliance, or regulatory review. This end-to-end process ensures that sensitive field information is collected in a standardized, tamper-evident, and privacy-protected format, laying a secure foundation for downstream risk analysis and compliance operations.

In certain embodiments, cryptographic verification program 110 may be configured to initiate cryptographic validation of any report's content and authenticity by cross-referencing the on-chain hash with the encrypted off-chain record. This design enables both privacy and independent proof of compliance storing only minimal, anonymized data on the blockchain, while retaining the complete, unaltered report and evidence in secure, encrypted off-chain storage.

Figure 4:
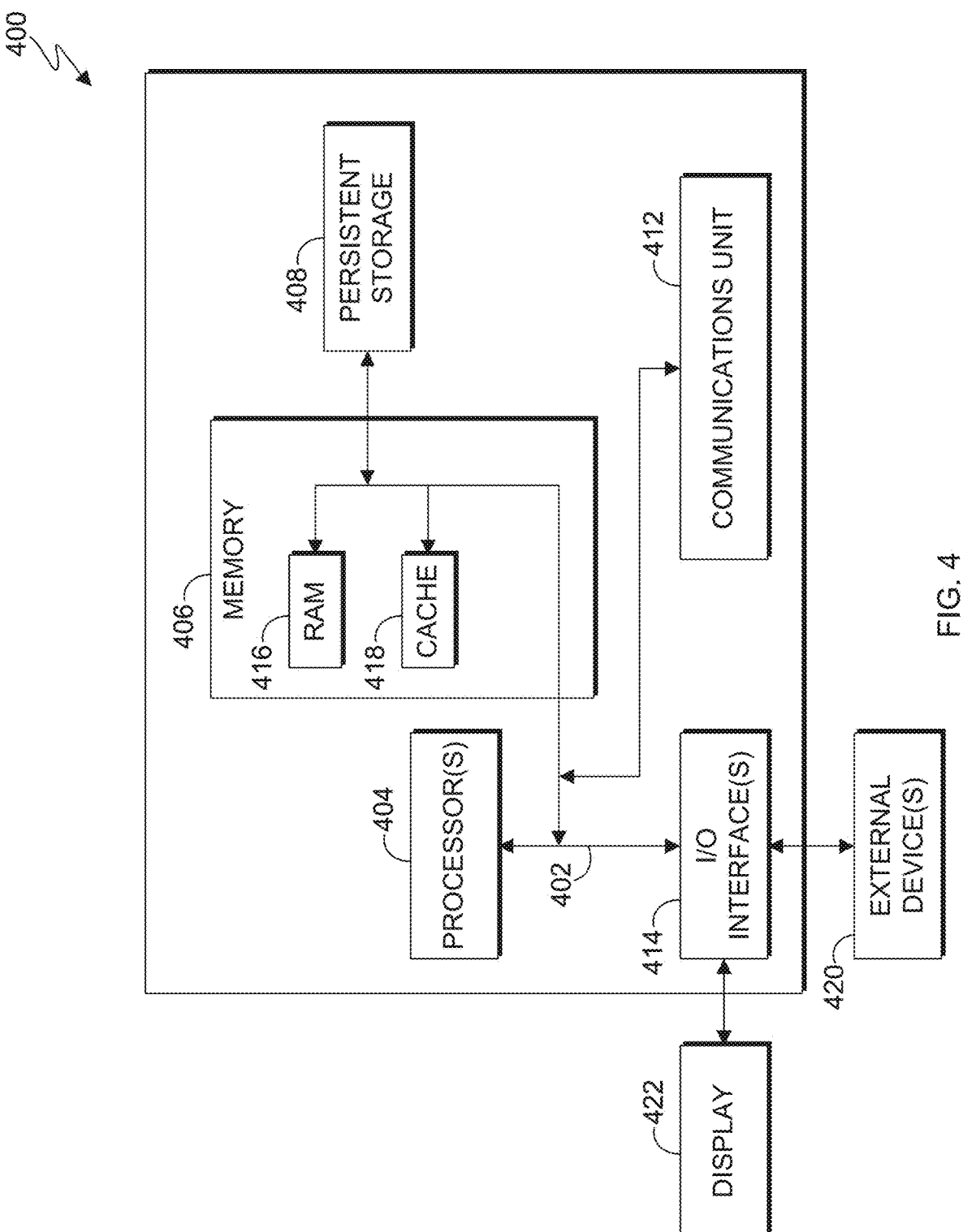
FIG. 4 depicts a block diagram of components of the computing systems of FIG. 1, in accordance with various embodiments of the systems and methods disclosed herein.

FIG. 4 depicts a block diagram of components of computing systems within computing environment 100 of FIG. 1, in accordance with an aspect of the systems and methods of the present disclosure. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment. However, it should be appreciated that any particular program nomenclature herein is used merely for convenience, and thus aspects of the systems and methods disclosed herein should not be limited to use solely in any specific application identified and/or implied by such nomenclature.

Computer system 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Cryptographic verification program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Cryptographic verification program 110 may be downloaded to persistent storage 408 through communications unit 410.

I/O interface(s) 412 allows for input and output of data with other devices that may be connected to computing device 102 and server computer 108. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice aspects of the present disclosure can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Aspects of the various systems and methods may be a system, a method, and/or a computer program product (CPP). Various aspects of the disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Aspects of the systems and methods of the present disclosure are described herein with reference to flowchart illustrations and/or block diagrams of methods, apparatus (systems), and computer program products according to aspects of the various systems and methods disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the systems and methods of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the systems and methods of the present disclosure have been presented for purposes of illustration but are not intended to be exhaustive or limited to the embodiments disclosed. Many modifications and variations will be apparent to those of ordinary skill in the art without departing from the scope and spirit of aspects of the present disclosure. The terminology used herein was chosen to best explain the principles of the embodiment, the practical application or technical improvement over technologies found in the marketplace, or to enable others of ordinary skill in the art to understand the embodiments disclosed herein.

Figure 5:
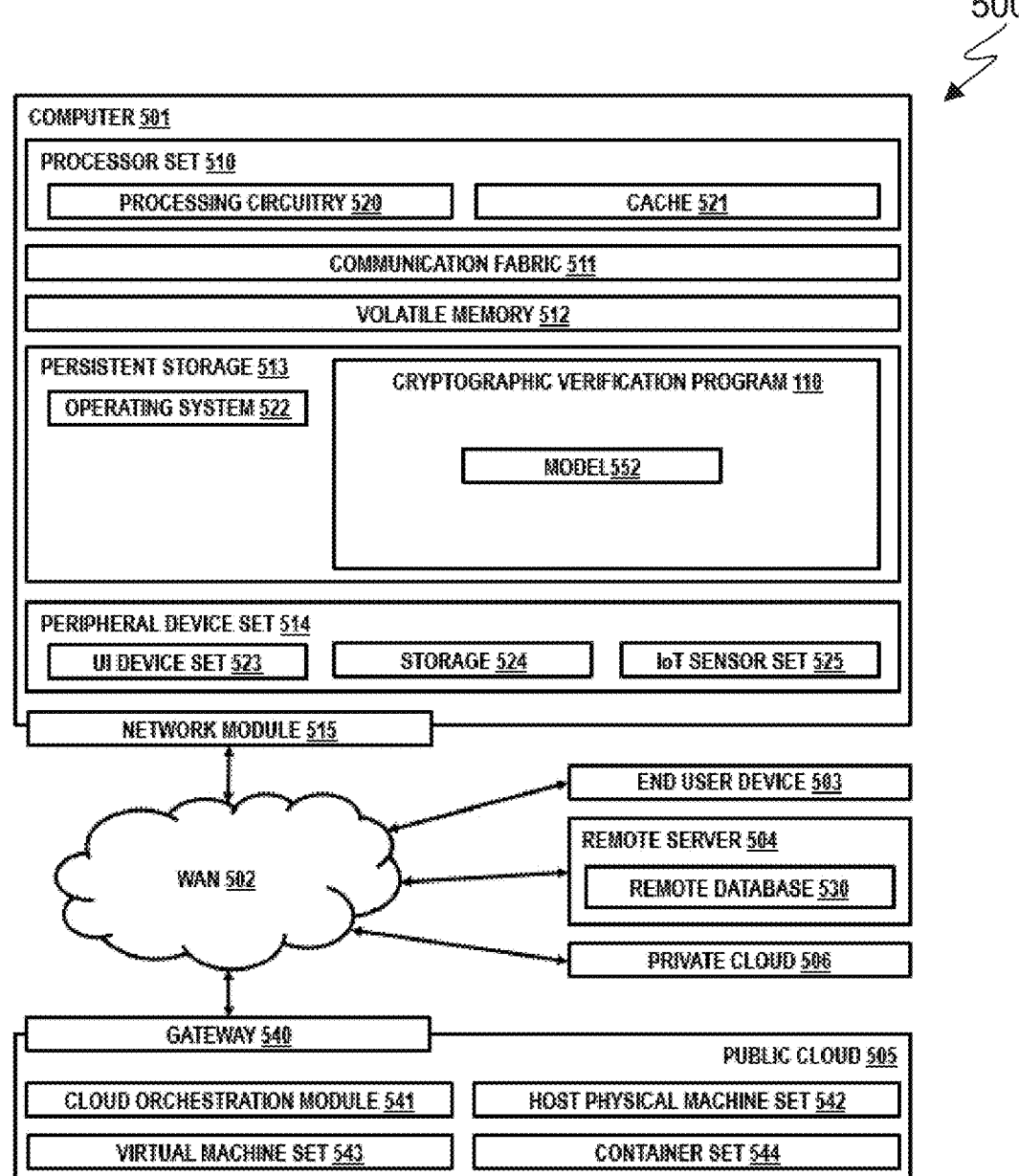
FIG. 5 depicts a block diagram illustrating an alternate computing environment, in accordance with various embodiments of the systems and methods disclosed herein.

FIG. 5 depicts an alternate computing environment 500 illustrating components of computer 501 in accordance with an alternate embodiment. It should be appreciated that FIG. 5 provides only an illustration of one implementation and does not imply any limitations with regard to the environments in which different embodiments may be implemented. Many modifications to the depicted environment may be made.

Computing environment 500 contains an example of an environment for the execution of at least some of the computer code involved in performing the inventive methods, such as receiving authentication information associated with a report submission from a user device; in response to receiving authentication information, authenticating a user based on a comparison of organization-specific credentials and the received authentication information; in response to a successful authentication, establishing an anonymized session that dissociates a user's identity from the report submission; receiving a report condition data for the report submission during the anonymized session, the report condition data comprising geolocation data, equipment status, environmental conditions, and photographic evidence; generating a cryptographic hash of the report submission and report condition data with a timestamp, the cryptographic hash uniquely corresponds to the report submission and report condition data, such that subsequent access to the report submission can be authenticated; and storing the cryptographic hash and timestamp as an immutable entry on a distributed ledger while storing the report condition data in a secure off-chain storage.

In addition to cryptographic verification program 110, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and cryptographic verification program 110, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip". In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in member key program 510 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in cryptographic verification program 110 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 1002 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Cryptographic verification program 110 is a program, a subprogram of a larger program, an application, a plurality of applications, or mobile application software, which functions to enable anonymous, authenticated mobile reporting and documentation of infrastructure conditions through a session-based protocol that dissociates user identity from submitted reports and support both online and offline operation by generating cryptographic hashes and digital signatures at the time and place of data capture, later synchronizing immutable records to a distributed ledger upon network restoration. In various embodiments, cryptographic verification program 110 may implement the following steps: receiving authentication information associated with a report submission from a user device; in response to receiving authentication information, authenticating a user based on a comparison of organization-specific credentials and the received authentication information; in response to a successful authentication, establishing an anonymized session that dissociates a user's identity from the report submission; receiving a report condition data for the report submission during the anonymized session, the report condition data comprising geolocation data, equipment status, environmental conditions, and photographic evidence; generating a cryptographic hash of the report submission and report condition data with a timestamp, the cryptographic hash uniquely corresponds to the report submission and report condition data, such that subsequent access to the report submission can be authenticated; and storing the cryptographic hash and timestamp as an immutable entry on a distributed ledger while storing the report condition data in a secure off-chain storage. In another embodiment, the functionality of cryptographic verification program 110, or any combination programs thereof, may be integrated into a single software program. In some embodiments, cryptographic verification program 110 may be located on separate computing devices (not depicted) but can still communicate over WAN 502. In various embodiments, client versions of cryptographic verification program 110 resides on any other computing device (not depicted) within computing environment 500. In the depicted embodiment, cryptographic verification program 110 includes model 552 and can leverage model 552 to extract field condition data from the field report, including geolocated observations, environmental factors, equipment indicators, and time-stamped evidence for the corresponding geographic area.

Model 552 is representative of a model utilizing deep learning techniques to train, calculate weights, ingest inputs, and output a plurality of solution vectors. In an embodiment, model 552 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 552 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 552 is a recurrent neural network (RNN) trained utilizing supervised training methods.

Aspects of the present disclosure may contain various accessible data sources, such as database 554, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Cryptographic verification program 110 may provide informed consent, with notice of the collection of personal data, allowing the user to opt in or opt out of processing personal data. Consent can take several forms: opt-in consent imposes on the user to take an affirmative action before the personal data is processed, alternatively, opt-out consent imposes on the user to take an affirmative action to prevent the processing of personal data before the data is processed. Cryptographic verification program 110 enables the authorized and secure processing of user information, such as tracking information, as well as personal data, such as personally identifying information or sensitive personal information. Cryptographic verification program 110 may provide information regarding the personal data and the nature (e.g., type, scope, purpose, duration, etc.) of the processing. Cryptographic verification program 110 may provide the user with copies of stored personal data. Cryptographic verification program 110 may allow the correction or completion of incorrect or incomplete personal data. Cryptographic verification program 110 may allow the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Figure 6:
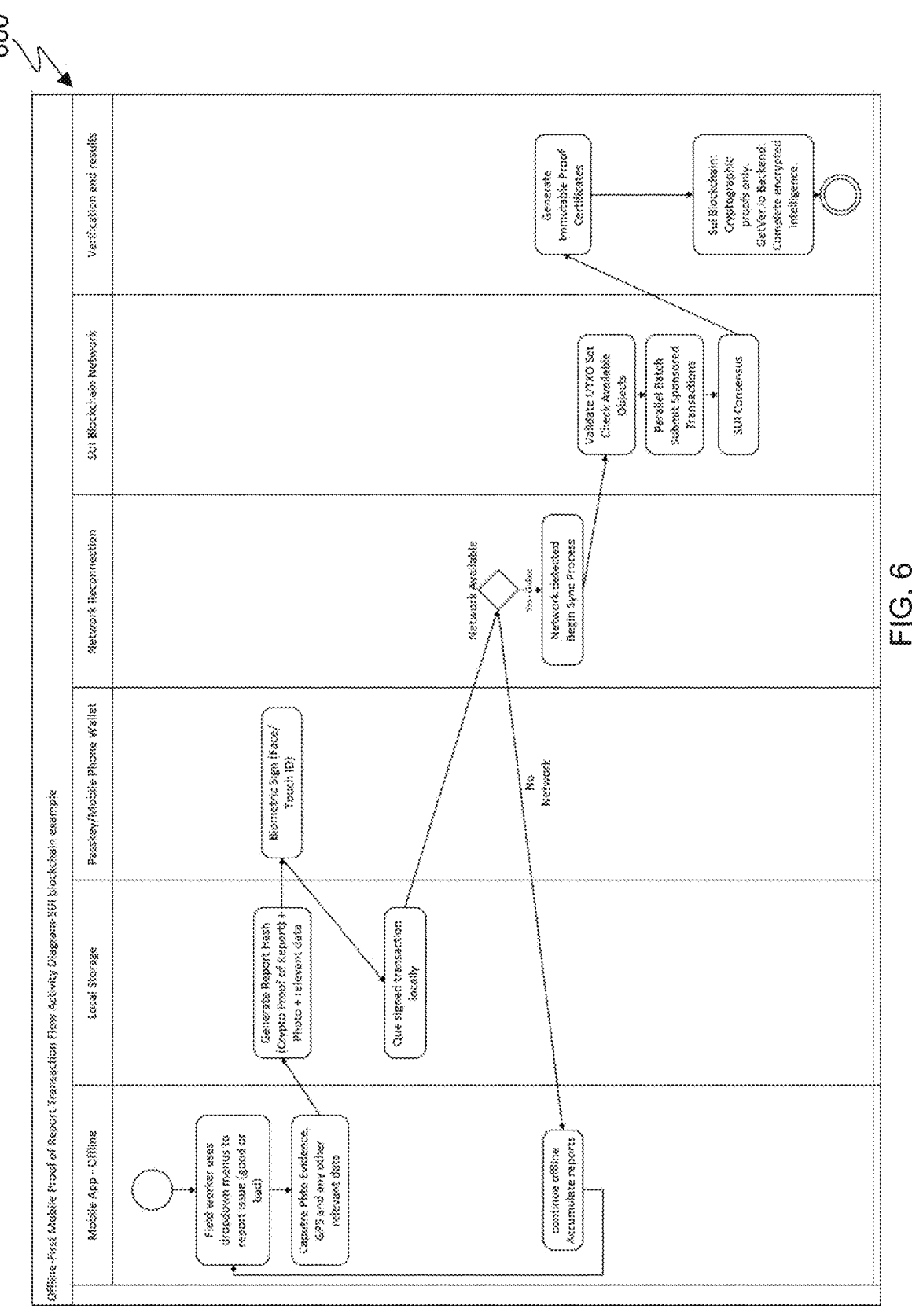
FIG. 6 is an example flow diagram illustrating alternate operational steps for offline collection, in accordance with various embodiments of the systems and methods disclosed herein.

FIG. 6 is an example flow diagram 600 illustrating alternate operational steps for offline collection, in accordance with various embodiments of the systems and methods disclosed herein.

In an alternate "offline first" mobile transaction flow, cryptographic verification program 110 is designed to flexibly handle both connected and offline operating modes for secure report verification. The process initiates following a successful user authentication while in online mode as described in FIGS. 2A and 2B. Cryptographic verification program 110 may then query the network to determine available on-chain resources, estimate required transaction fees, and proactively construct multiple unsigned transaction templates, storing both the current system state and the generated transaction templates for future activities.

In this example, should network connectivity be lost, cryptographic verification program 110 detects this transition and seamlessly shifts to offline operation. In this example, a field worker may operate cryptographic verification program 110 in an offline mode to document safety issues using predefined dropdown menus within the mobile application. The user may capture photographic evidence, GPS coordinates, and other relevant report data at the time of the incident. Cryptographic verification program 110 can continue to accumulate multiple report submissions and associated field condition data while network connectivity remains unavailable, supporting the efficient collection of batch field evidence. During the offline interval, when field data and supporting evidence are captured, cryptographic verification program 110 generates a cryptographic report hash (serving as a tamper-evident proof of report). Cryptographic verification program 110 then selects an appropriate stored transaction template corresponding to the report type or activity. During the ongoing offline session and in response to receiving report submissions and/or field condition data, cryptographic verification program 110 may use biometric authentication (e.g., fingerprint or facial recognition event) to authorize the creation of the session wallet and/or to sign the pending transaction. In certain embodiments, during the ongoing offline session and in response to receiving report submissions and/or field condition data, cryptographic verification program 110 may prompt for biometric reauthentication such as via fingerprint or facial recognition to sign the transaction.

While remaining offline, cryptographic verification program 110 continuously monitors network status. If connectivity is still unavailable, cryptographic verification program 110 embeds the generated report hash into the selected transaction template, applies a digital signature (using securely stored private keys or those provisioned after biometric authentication), and stores the signed transaction within a dedicated queue. Simultaneously, cryptographic verification program 110 stores the full report data and evidence locally on the device, encrypted to maintain confidentiality and integrity, thus queuing both the signed transaction and accompanying data for future synchronization.

In instances where a distributed ledger such as Alephenium is used, once network connectivity is restored, cryptographic verification program 110 reevaluates the validity of any previously cached on-chain resources associated with the queued transactions. For example, cryptographic verification program 110 performs a UTXO set validation to check the availability of required blockchain objects, enabling resource-ready transaction handling. If the cached resources remain valid, cryptographic verification program 110 proceeds to broadcast the signed transactions to the blockchain, waits for transaction confirmation. In instances where a distributed ledger such as SUI is used, cryptographic verification program 110 may then conduct parallel batch submission of sponsored transactions to the underlying blockchain protocol, such as SUI, leveraging consensus mechanisms to ensure robust, tamper-evident recording. Upon confirmation by the SUI consensus protocol, cryptographic verification program 110 generates an immutable proof certificate for each verified transaction and records only cryptographic proof data as new entries to the SUI blockchain. Meanwhile, the backend system is updated with the corresponding, fully encrypted intelligence derived from the submitted field reports and evidence, ensuring both regulatory auditability on-chain and secure, private data retention off-chain. In the event that cached resources are no longer valid (e.g., due to changes in fee rates, chain state, or other external factors), cryptographic verification program 110 automatically rebuilds fresh transaction templates using updated information, prompts a subsequent round of biometric authentication to digitally sign the transaction, and only then proceeds to broadcast the transaction, ensuring the process remains secure, compliant, and auditable end-to-end.

Figure 7:
FIG. 7 is an example flow diagram illustrating operation steps for human in the loop online reporting process with blockchain anchoring, in accordance with various embodiments of the various systems and methods disclosed herein.

FIG. 7 illustrates an operational flow wherein cryptographic verification program 110 orchestrates a human-in-the-loop online reporting process, anchored on the blockchain, in accordance with various embodiments of the disclosed systems and methods. In this example, the user has previously established an authenticated and anonymized session as described in the flow of FIG. 2A, and remains connected to the network.

The process is initiated when the worker generates a new report through the application interface, providing field condition data such as photographic evidence, observations, and accompanying metadata. To enhance security and confirm user presence, cryptographic verification program 110 prompts for, and verifies, biometric authentication (e.g., facial or fingerprint recognition) prior to report submission. Upon successful biometric verification, cryptographic verification program 110 enables the user to digitally sign the transaction that leverages a distributed ledger wallet created for the anonymized session while configuring the transaction as "company-sponsored," such that the user is relieved of any blockchain transaction (gas) fees.

Upon receipt of the field condition data (e.g., an image, text, audio, video, etc.), cryptographic verification program 110 encrypts the image locally on the user device using a strong symmetric encryption algorithm, such as AES-256. Cryptographic verification program 110 may then encrypt all associated metadata including timestamp, classification category, and any other report attributes on the user device. Cryptographic verification program 110 may then generate a cryptographic hash of the report and its associated data to serve as a tamper-evident blockchain proof and securely stores the encrypted report locally for robustness against connectivity interruptions.

Cryptographic verification program 110 evaluates current network status. If the user is determined to be offline at this point, cryptographic verification program 110 reverts to the "offline-first" transaction flow described previously in FIG. 6. When the user is online, cryptographic verification program 110 transmits the encrypted report, field condition data, and their corresponding hashes to the backend infrastructure.

At the backend, cryptographic verification program 110 verifies the anonymous session ID associated with the authenticated session, ensuring continued anonymity and compliance with privacy guarantees. The backend then stores the encrypted report and associated metadata in a secure main database. In this example, cryptographic verification program 110 may store image files in an object storage system (e.g., AWS S3 or an equivalent platform). Concurrently, cryptographic verification program 110 generates and broadcasts a blockchain transaction to anchor the cryptographic hash representing the report to the blockchain, writing the hash and any necessary pointers to the distributed ledger.

Cryptographic verification program 110 monitors the blockchain to confirm successful inclusion of the transaction, records the resulting transaction ID, and updates the internal system to link the report with its immutable on-chain reference. Finally, cryptographic verification program 110 displays a success message to the user via the mobile application, indicating completion of the process with a timestamp and confirmation of blockchain-level verification, thereby providing the user with immediate feedback that the report has been permanently, cryptographically anchored and acknowledged.

What is claimed is:

1. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information, wherein authenticating a user based on a comparison of organization-specific credentials and the received authentication information comprises:

generating a company-specific access code and authentication protocol, distributing the company-specific access code to one or more users, prompting entry of the company-specific access code and an associated authentication token by the user, and verifying user credentials by matching a one-time passcode against a company-verified directory;

in response to a successful authentication, establishing an anonymized session that dissociates a user's identity from the report submission;

receiving a report condition data for the report submission during the anonymized session, the report condition data comprising geolocation data, equipment status, environmental conditions, and photographic evidence;

generating a cryptographic hash of the report submission and report condition data with a timestamp; and uploading the cryptographic hash and timestamp as an immutable entry on a distributed ledger while storing the report condition data in a secure off-chain storage.

2. The computer-implemented method of claim 1, further comprising:

automatically removing or masking personal or device-identifying metadata, comprising exchangeable image file format (EXIF) data, media access control (MAC) addresses, or serial numbers, from any photographic evidence or file submitted during the anonymized session.

3. The computer-implemented method of claim 2, further comprising:

operating in an offline mode by locally generating and storing a cryptographic hash of anonymized field condition data with a timestamp on the user device when network connectivity is unavailable; and queuing the cryptographic hash for subsequent transmission to the distributed ledger.

4. The computer-implemented method of claim 3, further comprising:

receiving a cryptographically signed report submission and associated report condition data from the user device, signed offline;

detecting network connectivity; and in response to detecting network activity, uploading the cryptographic hash that corresponds to the cryptographically signed report submission as a subsequent entry to the distributed ledger while storing the associated report condition data in the secure off-chain storage.

5. The computer-implemented method of claim 1, further comprising:

in response to receiving a regulatory request, enforcing granular access controls to decrypt and provide only a portion of encrypted field condition data associated with a specific report submission.

6. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information, in response to a successful authentication, establishing an anonymized session that dissociates a user's identity from the report submission;

receiving a report condition data for the report submission during the anonymized session, the report condition data comprising geolocation data, equipment status, environmental conditions, and photographic evidence;

generating a cryptographic hash of the report submission and report condition data with a timestamp;

uploading the cryptographic hash and timestamp as an immutable entry on a distributed ledger while storing the report condition data in a secure off-chain storage;

operating in an offline mode by locally generating and storing a cryptographic hash of anonymized field condition data with a timestamp on the user device when network connectivity is unavailable;

queuing the cryptographic hash for subsequent transmission to the distributed ledger;

enrolling biometric authentication credentials locally on the user device during the anonymized session;

storing biometric data exclusively on the user device without external transmission; and enabling subsequent authentication using locally stored biometric credentials mapped only to a random session identifier.

7. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information, in response to a successful authentication, establishing an anonymized session that dissociates a user's identity from the report submission, wherein establishing an anonymized session that dissociates a user's identity from the report submission comprises:

generating a random session identifier for an authenticated user, permanently destroying any technical pathway to reconstruct an association between the user's identity and the random session identifier, associating subsequent report submissions of the authenticated user during the anonymized session with only the random session identifier, and ensuring the anonymized session persists independently of credentials associated with the authenticated user;

receiving a report condition data for the report submission during the anonymized session, the report condition data comprising geolocation data, equipment status, environmental conditions, and photographic evidence;

generating a cryptographic hash of the report submission and report condition data with a timestamp; and uploading the cryptographic hash and timestamp as an immutable entry on a distributed ledger while storing the report condition data in a secure off-chain storage.

8. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information;

in response to a successful authentication, establishing an anonymized session that dissociates a user's identity from the report submission;

receiving a report condition data for the report submission during the anonymized session, the report condition data comprising geolocation data, equipment status, environmental conditions, and photographic evidence;

generating a cryptographic hash of the report submission and report condition data with a timestamp;

uploading the cryptographic hash and timestamp as an immutable entry on a distributed ledger while storing the report condition data in a secure off-chain storage;

in response to authenticating the user, generating a unique anonymous web3 identity comprising a user cryptographic wallet address and session management system; and providing a client-side wallet interface that enables the authenticated user to control private cryptographic keys solely on the user device.

9. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information;

in response to a successful authentication, establishing an anonymized session that dissociates a user's identity from the report submission;

receiving a report condition data for the report submission during the anonymized session, the report condition data comprising geolocation data, equipment status, environmental conditions, and photographic evidence;

generating a cryptographic hash of the report submission and report condition data with a timestamp;

uploading the cryptographic hash and timestamp as an immutable entry on a distributed ledger while storing the report condition data in a secure off-chain storage;

in response to receiving a request to authenticate a stored report submission, retrieving a hash and digital signature associated with the report submission from the distributed ledger;

decrypting corresponding report condition data from the secure off-chain storage using authorized access protocols;

recomputing a cryptographic hash of the decrypted corresponding report condition data;

verifying that the recomputed cryptographic hash matches the hash retrieved from the distributed ledger; and validating the digital signature using a public key associated with the anonymized session.

10. A computer-implemented method for anonymized user authentication that dissociates a user's identity from a report submission after successful authentication, the method being performed by one or more processors programmed with program instructions which, when executed, cause the one or more processors to perform the steps of:

receiving authentication information associated with a report submission from a user device;

in response to receiving authentication information, authenticating a user based on a comparison of organization-specific credentials and the received authentication information;

in response to a successful authentication, establishing an anonymized session that dissociates a user's identity from the report submission;

receiving a report condition data for the report submission during the anonymized session, the report condition data comprising geolocation data, equipment status, environmental conditions, and photographic evidence;

generating a cryptographic hash of the report submission and report condition data with a timestamp, wherein generating a cryptographic hash comprises:

assembling the report submission, the report condition data, associated geolocation coordinates, and temporal data into a data structure, and generating a corresponding cryptographic hash value from the assembled data structure, such that the corresponding cryptographic hash value uniquely represents the report submission, the report condition data, the associated geolocation coordinates, and the temporal data; and uploading the cryptographic hash and timestamp as an immutable entry on a distributed ledger while storing the report condition data in a secure off-chain storage.

* * * * *